US008516251B2

(12) United States Patent
Qu et al.

(10) Patent No.: US 8,516,251 B2
(45) Date of Patent: Aug. 20, 2013

(54) DEVICE AND METHOD FOR DIGITAL RIGHT MANAGEMENT

(75) Inventors: Jin Qu, Shanghai (CN); Fulong Ma, Shanghi (CN)

(73) Assignee: Koninklijke Philips N.V., Eindhoven (NL)

( * ) Notice: Subject to any disclaimer, the term of this patent is extended or adjusted under 35 U.S.C. 154(b) by 452 days.

(21) Appl. No.: 12/808,712

(22) PCT Filed: Dec. 17, 2008

(86) PCT No.: PCT/IB2008/055364
§ 371 (c)(1),
(2), (4) Date: Jun. 17, 2010

(87) PCT Pub. No.: WO2009/083869
PCT Pub. Date: Jul. 9, 2009

(65) Prior Publication Data
US 2010/0268950 A1 Oct. 21, 2010

(30) Foreign Application Priority Data
Dec. 20, 2007 (CN) .......................... 2007 1 0159812

(51) Int. Cl.
*H04L 29/06* (2006.01)
(52) U.S. Cl.
USPC .................... 713/168; 726/4; 726/26; 726/27
(58) Field of Classification Search
USPC ................... 713/168; 726/27, 4, 26; 705/57, 705/59
See application file for complete search history.

(56) References Cited

U.S. PATENT DOCUMENTS

| 6,832,319 | B1* | 12/2004 | Bell et al. ....................... 713/193 |
| 7,065,216 | B1* | 6/2006 | Benaloh et al. ............... 380/282 |
| 2003/0076955 | A1* | 4/2003 | Alve et al. ..................... 380/201 |
| 2003/0120605 | A1* | 6/2003 | Fontana et al. ................. 705/59 |
| 2004/0168077 | A1* | 8/2004 | Waxman et al. ............... 713/200 |
| 2005/0278787 | A1* | 12/2005 | Naslund et al. ................. 726/26 |
| 2006/0150257 | A1* | 7/2006 | Leung et al. .................... 726/27 |
| 2007/0226807 | A1 | 9/2007 | Ginter et al. |

FOREIGN PATENT DOCUMENTS
WO  2006051043 A1  5/2006

OTHER PUBLICATIONS

Ziolowski et al: "Mobile Agent-Based Digital Rights Management Scheme"; IEEE, 6th International Conference on Computer Information Systems and Industrial Applications (CISIM '07), Jun. 2007, pp. 213-218.

Xue et al: "Research on DRM Track & Audit Based on Mobile Agent Technology"; The 8th International Conference on Computer Supported Cooperative Work in Design Proceedings; IEEE, May 2004, vol. 1, pp. 340-343.

* cited by examiner

*Primary Examiner* — Chau Le

(57) ABSTRACT

The present invention provides a method for authenticating the copy right of a device by an offline way, a digital right protection system, and a method for providing digital contents, which mainly includes embedding an authentication agent into the digital content, said authentication agent, instead of the copyright issuer at the server side, authenticates the rendering qualification of the device before rendering the digital content. If the device is a non-compliant device, the authentication agent will not permit the device to render the digital content. The technique of the invention realizes offline digital right management, so it is not restricted by the network condition and can be applied widely in various environments.

16 Claims, 6 Drawing Sheets

DEVICE AND METHOD FOR DIGITAL RIGHT MANAGEMENT

TECHNICAL FIELD

The present invention relates to the Digital Right Management (DRM) technique, in particular to a method for digital right protection based on techniques of encryption and validity authentication, and to a device and a method for rendering the digital contents that have digital right protection.

BACKGROUND ART

The characteristics of digitized information require that there should be a unique technique to enhance protection of the copyright of such digitized audio and video program contents, and such a technique is called the Digital Right Management (DRM) technique.

The operating principle of the Digital Right Management technique is typically as such: a digital content authorization center is established first to encode the compressed digital contents, the digital contents are encrypted by a key, and the head of the encrypted digital contents stores the digital content ID and the address of the authorization center. When the user renders (play) the digital contents, a license for the relevant embedded decryption key is sent to the user after authentication and authorization by the digital content authorization center according to the content ID and the address information at the head of the program, then the digital contents can be rendered. Since the contents to be protected are encrypted, and thus even they are downloaded and stored by a user, they cannot be rendered without the authentication and authorization by the digital program authorization center. Consequently, the copyright of the program is strictly protected.

In the prior art, there are three types of DRM mode. One of them is device based DRM, wherein a right to render a digital content item is granted to one or several devices; another mode is user based DRM, wherein the right is granted to a user; and the other mode is hybrid DRM, wherein the right is granted to a device or a user, and this means that any user can render the encrypted digital content on the authorized device and the authorized user can render the encrypted digital content on any device.

FIG. 1A shows a DRM system of the prior art. As shown in FIG. 1A, said DRM system generally includes a Service provider (SP), a Right Issuer, a DRM terminal and a storage medium. The Service Provider and the Right Issuer are usually associated with each other and can be integrated together. The storage medium can be a network store or various types of movable media. The DRM terminal can be a software program or a hardware for solidifying the program function, which can be installed on a device. Said device may be various digital terminals having a rendering function, such as a mobile phone having a player, a Personal Digital Assistant (PDA), a set top box, a lap top, an MP3, an MP4, an electronic book reader, etc. The rendering mentioned here includes the meaning of reading the contents of digital texts. The digital right management function of the device is achieved through a DRM module thereon.

FIG. 1B shows a flow chart of DRM in the prior art. As shown in this figure, firstly, the client device obtains the digital contents including the encrypted digital program from the digital content issuer. A single digital content includes not only the encrypted digital program, but also some other components, such as the header. Wherein the format of the digital program can be audio, video, text or else. The way of distributing or obtaining digital contents can be implemented by downloading from web sites, issuing CD, and distributing digital contents through IPTV or wireless transmission, etc. As a result, when begin to render a program, the device shall get the license for rendering the program from the right issuer according to the prompt or instruction of the digital contents, and then renders the program in the digital contents using the license.

Nevertheless, there are still some disadvantages in the DRM techniques of the prior art, as need to be overcome. For example, in the device based DRM system, before granting the license to a device, the copy right issuer shall checks if the device is compliant on the basis of a whitelist or a blacklist, and if the device is non-compliant, the right issuer does not grant a right to the device. In the person based or hybrid DRM, it is necessary to firstly perform a real-time authentication on the device used thereof; but when the device is offline, the authentication center cannot issue the license in real-time or cannot authenticate the copyright of the device, thus it is difficult to identify whether the device is authorized to render the digital contents.

SUMMARY OF THE INVENTION

It is an object of the present invention to provide a device and a method for Digital Right Management, which enables to identify whether the device has the right to render the digital program irrespective of whether the device is connected to the authentication server or not.

According to one embodiment of the invention, a method for providing digital contents to the user is provided. The method comprises the following steps: encoding the digital program to enable the digital program to be associated with an authentication agent, wherein said authentication agent includes a program code block executable by a device that can render said digital program for authenticating the validity of the device; and providing a digital content including said digital program and said authentication agent to said device through an online or an offline way.

In an embodiment, the digital program is encrypted by a first encryption algorithm. The decryption key CK of the first encryption algorithm is encrypted by a second encryption algorithm and stored in the authentication agent. The program code block is also operable to decrypt the encrypted key CK after the validity of the device has passed the authentication so as to obtain key CK and send it to the DRM module in the device, and said DRM module then decrypts the encrypted digital program in the digital content; or after the validity of the device has passed the authentication, the authentication agent sends the decryption key of CK to the DRM module in the device, so that the DRM module decrypts the encrypted CK, finally, the DRM module decrypts the encrypted digital program in the digital content by CK. Said DRM module is a Digital Right Management Module pre-installed on the device.

According to another embodiment of the invention, a method for rendering a digital content on a device is provided. Said method comprises the following steps: obtaining a digital content from a Service Provider, said digital content including a digital program and an authentication agent; running said authentication agent (301) to authenticate the validity of the device; decrypting the digital program (304) after a successful authentication; and rendering the decrypted digital content.

According to another embodiment of the invention, a method for offline authenticating the qualification of the device for rendering the digital content is provided, which comprises: embedding an authentication agent into the digital content so that when said digital content is led into a device, the authentication agent runs and authenticates if the device has the qualification to render the digital content.

According to another embodiment of the invention, a device for rendering a digital content is provided. Said device comprises: an obtaining module for obtaining the digital content from a Service Provider, said digital content including a digital program and an authentication agent; a DRM module for running the authentication agent to authenticate the validity of the device and for decrypting the digital program after a successful authentication; and a rendering means for rendering the decrypted digital program.

As can be seen, a prominent advantage of the invention is that it enables an offline digital right authentication to identify whether the device is a valid renderer, and such authentication can be performed at the device, thus reducing the burden at the server and making it possible to perform copy right authentication at any appropriate location without being restricted by the network condition.

Other objects and attainments together with a fuller understanding of the invention will become apparent and appreciated by referring to the following description and claims taken in conjunction with the accompanying drawings.

DESCRIPTION OF THE DRAWINGS

Throughout the drawings, the same reference numerals indicate the same similar or corresponding features or functions.

DETAILED DESCRIPTION OF THE INVENTION

According to the present invention, the encryption scheme used in the invention is illustrated firstly. To make the illustration clearer and more concise, the following two formulae are employed:

$$Y=E_k(x) \tag{1}$$

Where E is an encryption algorithm, x is the message to be encrypted, Y is the encrypted message, and k is the key used to encrypt message;

$$Y=D_k(x) \tag{2}$$

Where D is a decryption algorithm, x is the message to be decrypted, y is the decrypted message, and k is the key used to decrypt message.

TABLE 1

| Key | Property explanations |
|---|---|
| CK | Digital program encryption and decryption key, for encrypting and decrypting the digital program |
| (Pa, Pb) | Key pair, for encrypting and decrypting CK |

Two groups of keys are used in the invention, one group is the symmetrical key CK used for encrypting the digital program when the Service provider (SP) distributes the digital content and for reversely decrypting on the device; and the other group is the asymmetrical keys (Pa, Pb) used for protecting the key CK, which includes a Key Encryption Key (KEK) Pa and a Key Decryption Key (KDK) Pb. Pa is used to encrypt CK through the encryption algorithm $Y=E_{Pa}(CK)$, and Pb is used to decrypt through the decryption algorithm equation $Y=D_{Pb}(x)$.

The digital right protection system will be illustrated as below based on the embodiments.

Figure 1A:
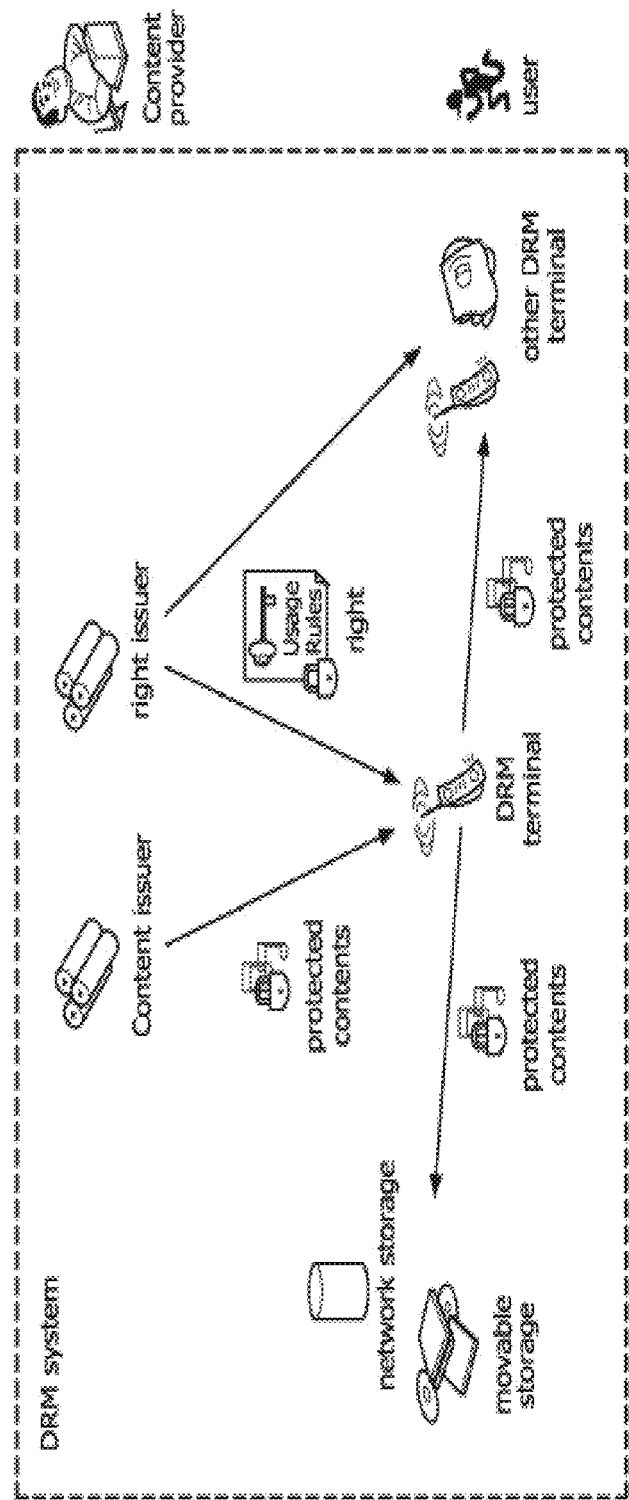
FIG. 1A shows a schematic drawing of a DRM scheme in the prior art.
Figure 1B:
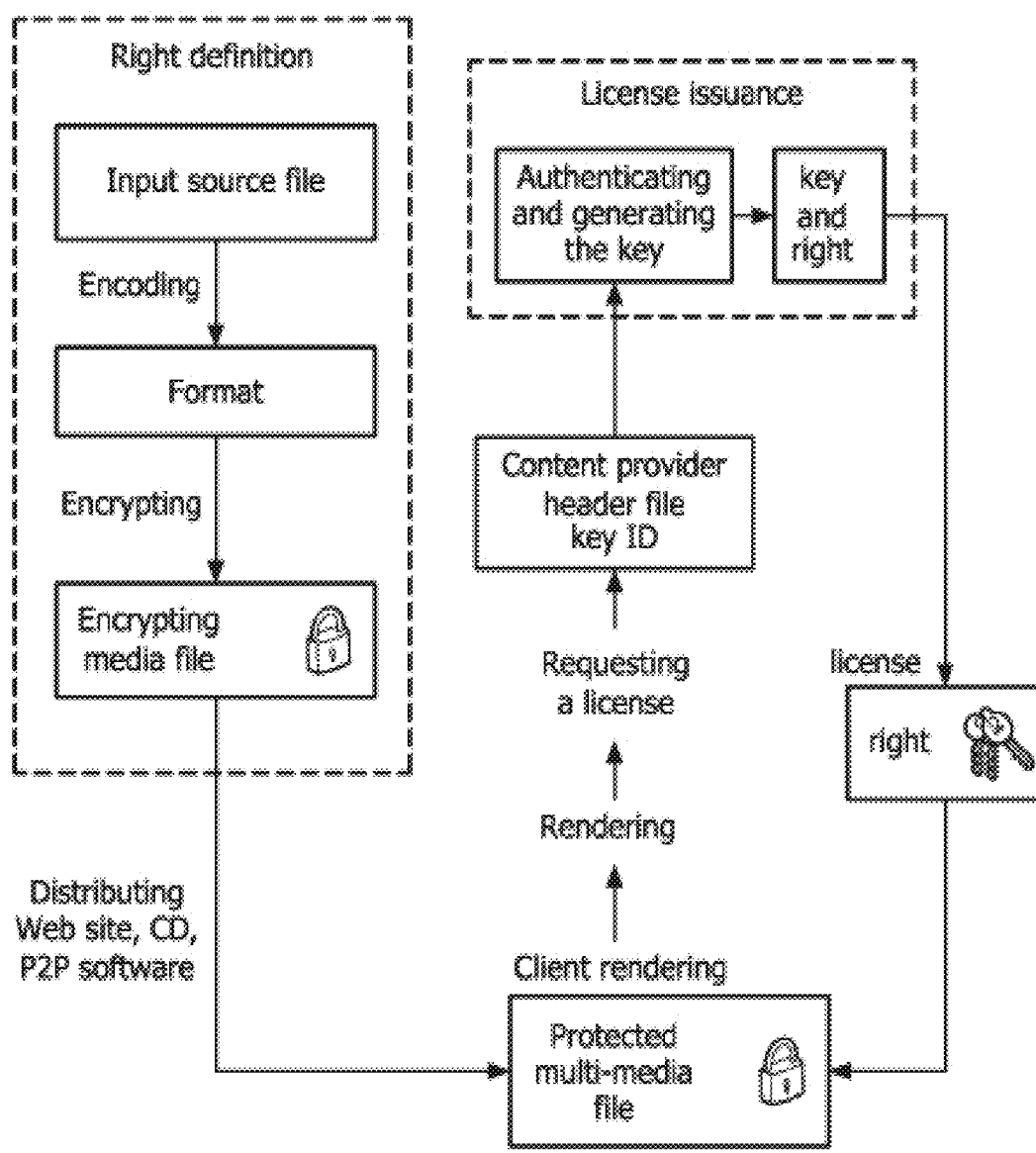
FIG. 1B shows a schematic flow chart of rendering an encrypted digital media content in the prior art.
Figure 2:
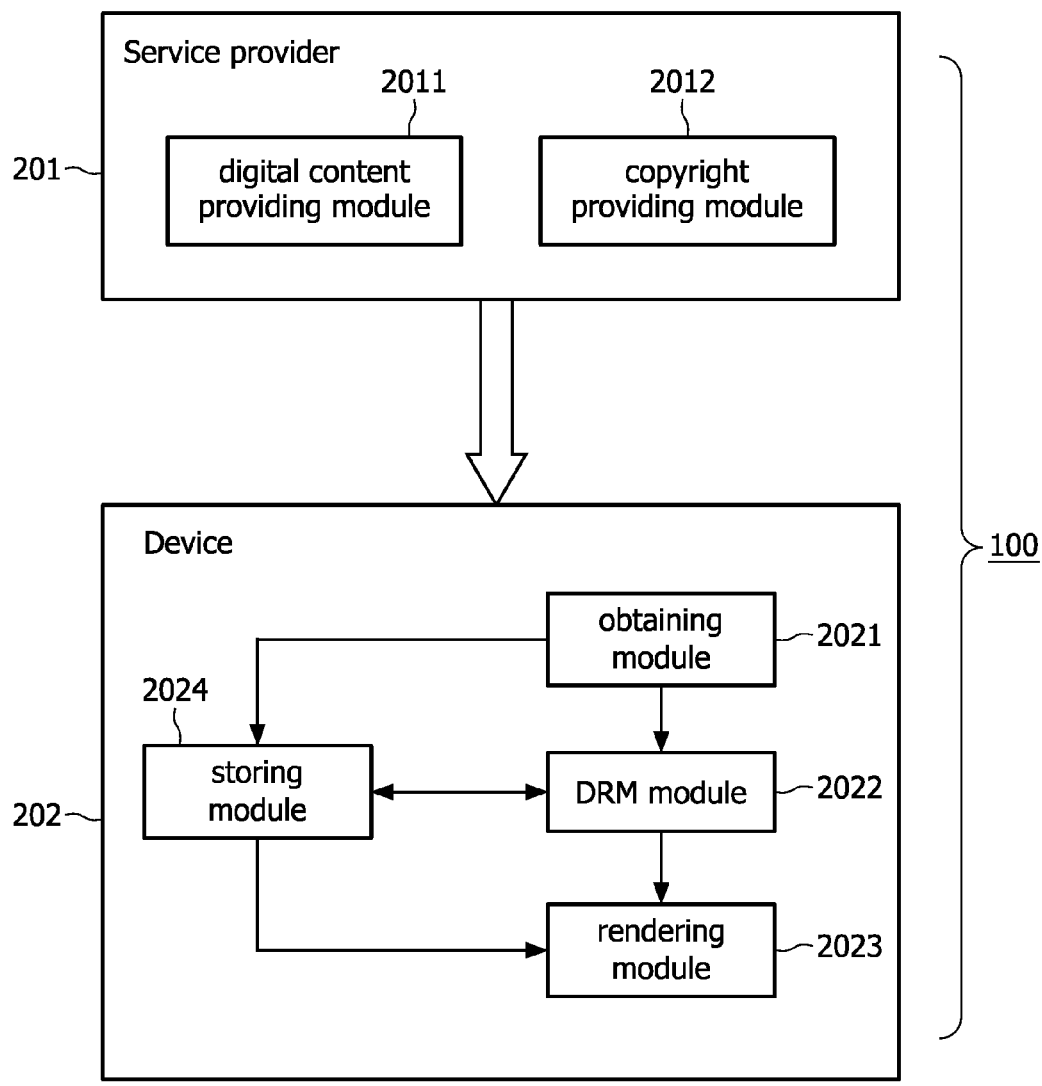
FIG. 2 shows a schematic drawing of a DRM system according to one embodiment of the present invention.

Referring to FIG. 2, the digital right protection system 100 consists of a Service Provider (SP) 201 and a device 202.

The Service Provider 201 is supported by a server and comprises two functional modules, i.e. a right providing module 2012 and a digital content providing module 2011, for respectively providing the license and the digital content. Said two modules can be integrated within one server, or can be in two separate servers. Said two modules do not necessarily provide service simultaneously. According to the embodiment of the invention, a possible instance is that the digital content providing module 2011 can provides digital contents by online way, while the right providing module 2012 provides the license by offline way; another possible instance is that the digital content providing module 2011 provides digital contents by offline way, while the right providing module 2012 provides the license by online way; and a further instance is that both the digital content providing module 2011 and the right providing module 2012 provide the digital contents and the license by online way or offline way. The license stipulates the rules for the device to render the digital contents. Furthermore, the device 202 cannot render the digital contents without an appropriate license.

The online providing mode includes transmitting and exchanging data between the Service Provider and the device through the Internet, WAP network, wireless transmission, etc. in conjunction with the wireless interface technique. The offline providing mode includes storing digital contents on a magnetic disc, an optical disc or other removable storage mediums and transferring the digital contents in a conventional way of transmission.

The device 202 can be various types of digital terminals having the rendering function, such as a mobile phone having a player, a Personal Digital Assistant (PDA), a set top box, a lap top, an MP3, an MP4, an electronic book reader, etc. According to one embodiment of the invention, device 202 further comprises a storage module 2023, alternatively, the storage module 2024 of device 202 has an identification code of the device solidified therein, which identification code can be read out and used for determining the identity of device 202. The storage module 2024 can also store the digital contents and license obtained from the Service Provider 201.

The digital right management function of device 202 is achieved by a DRM module 2022 thereon. The DRM module 2022 can be an independent software program or a software pluggable unit, or it can be a hardware circuit. According to one embodiment of the invention, the DRM module 2022 is assumed to be an independent software program. Generally, said DRM module 2022 is provided by the Service Provider 201 or by other persons or unities authorized by the Service Provider 201. An identification code is pre-arranged in the DRM module 2022 for determining the identity of DRM module 2022. This identity can be associated with the identity of the digital content rendering device. Alternatively, the DRM module 2022 can be arranged according to the needs to initiatively authenticate the validity of the digital content and to render only the digital content that passes the validity authentication.

According to an embodiment of the invention, among the digital contents provided by the Service Provider 201, each digital content 300 includes not only the digital program to be rendered, but also an embedded authentication agent 301. Said authentication agent 301 is in fact a software program module operable on the device 202, which is used for authenticating (doing for the Service Provider 201) whether the rendering device 202 (DRM module) is a valid user (authorized user). Wherein, this can be realized by authenticating whether the identification code of the DRM module 2022 on the device 202 belongs to one of a valid user. Thus, the offline digital right protection function is achieved.

According to an embodiment of the invention, the device 202 comprises an obtaining module 2021 for obtaining the digital contents provided by the Service Provider 201 and the Authentication Agent embedded into the digital contents.

According to an embodiment of the invention, the device 202 further comprises a rendering (playing) module 2023 for rendering (playing) the digital program according to the license obtained by device 202, said rendering module 2023 may be an audio/video decoding means such as MEPG-2, MEPG-4 decoder, etc., and the rendering right is limited by the license.

According to an embodiment of the invention, when the Service Provider 201 distributes digital program contents according to the user's demand (by online or offline way), it usually needs to first convert the digital program into a standard format, such as wma, asf, wmv, etc., and to encrypt the digital program using a suitable algorithm. Generally speaking, in order not to cause too much burden in computation, the symmetric cryptography is usually used, that is, the same key is used for both encrypting and decrypting. Of course, other ways of encrypting can be used too. In addition to encrypting the digital program, other relevant data are also added to the digital program content, then a digital signature is made and the digital program is packed into a single digital content. As described below, the encoding method used when the Service Provider 201 provides digital contents is explained in detail with reference to FIG. 3.

Figure 3:
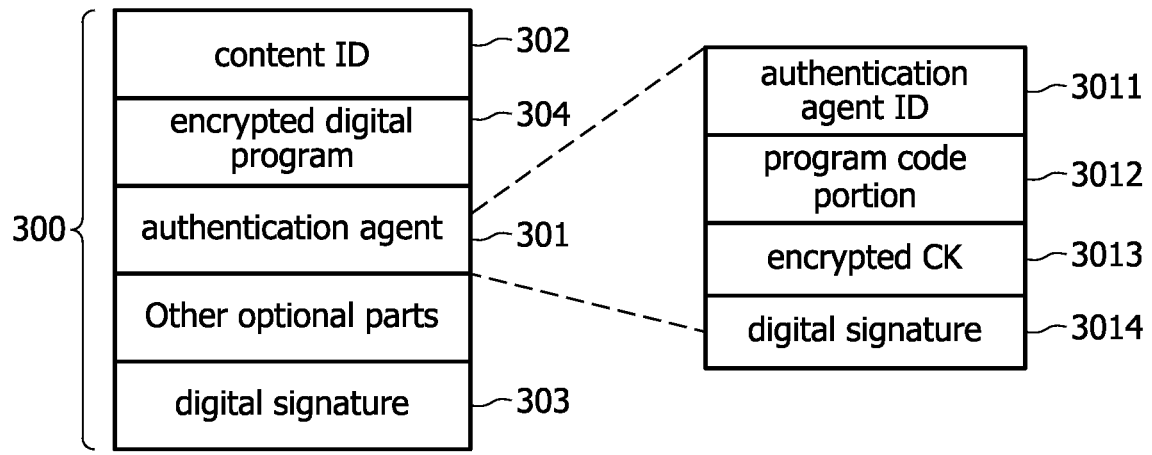
FIG. 3 shows a schematic drawing of the components of a digital content item edited with the digital content encoding method according to one embodiment of the present invention.

FIG. 3 shows an item of digital content edited by the digital content encoding method according to an embodiment of the present invention. As shown in the figure, a single digital content 300 includes an encrypted digital program 304, an authentication agent 301, a content ID 302, and some other optional components. Alternatively, it further includes a digital signature 303. The content ID 302 is used for indicating the serial number of the digital content. The digital signature 303 can indicate the identity of the digital content issuer and protect the integrity of the content. If the digital content 300 is tampered, it will be identified by authenticating the signature 303.

In addition, according to FIG. 3, the authentication agent 301 comprises an authentication agent ID 3011, a program code portion 3012, an encrypted key CK 3013 and a digital signature 3014, etc. The authentication agent ID 3011 indicates the serial number of the authentication agent 301 for associating with the related program content. The digital signature 3014 can indicate the identity of the issuer of the authentication agent 301 and protect the integrity of the authentication agent 301, etc. The key CK is a key for decrypting the encrypted digital content. The program code 3012 can perform and achieve two functions, one is to authenticate the validity of the rendering device 202 by using the embedded blacklist or whitelist, the other one is to decrypt the encrypted key CK 3013 or to deliver the decryption key of key CK to the DRM module 2022 which decrypts the key CK. Such decryption is performed through the Key Decryption Key Pb by using the decryption algorithm formula. Alternatively, the authentication agent 301 also comprises a Key Decryption Key Pb.

Figure 4:
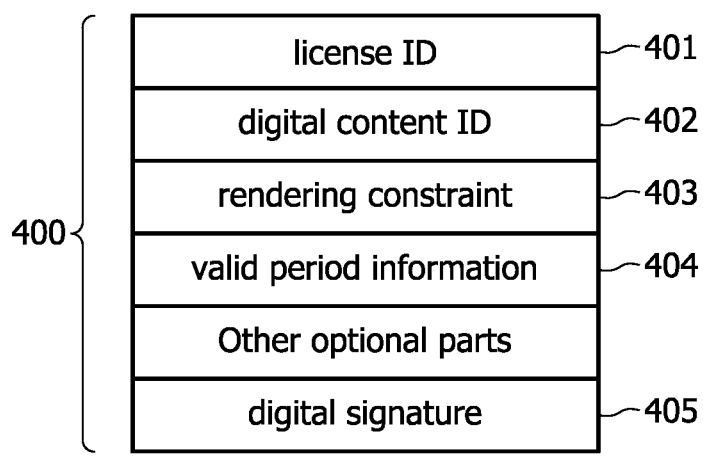
FIG. 4 shows a schematic drawing of the components of the license according to one embodiment of the present invention.

FIG. 4 shows the schematic components of the license 400 according to an embodiment of the present invention. The License 400 provided by the Service Provider mainly includes a license ID 401, a content ID 402, a rendering constraint 403, the valid period information 404, and a digital signature 405. Other optional parts may be present. The license ID 401 indicates the serial number of the license 400, the content ID 402 indicates the content program corresponding to said license 400. The valid period information 404 specifies the period of validity of the license 400, and the digital signature 405 indicates the identity of the issuer and/or the date of issuance of the license 400 and protects the integrity of the license.

The realization of the Digital Right Management function during rendering of the digital program on the device is specifically described as below with reference to FIGS. 5A and 5B.

The device is pre-installed a DRM module, which is usually provided by the Service Provider (facilitator) that provides the digital contents. The DRM modules provided by different facilitators may vary, that is, the DRM module provided by one Service Provider can be only used to render the digital contents provided by said service provider; or several facilitators maybe share one compatible DRM module, and then the DRM module provided by one Service Provider can render the digital contents provided by several Service Provider (SP).

The DRM module on the device needs to obtain a license for rendering the digital contents from a Service Provider so as to render the digital contents obtained from the Service Provider. Alternatively, the license can be obtained by downloading from the Service Provider, or by other feasible ways according to instructions, such as buying an optical disc having the license stored thereon. The user can download the obtained license and the DRM software program to the device, or even download them to a portable storage means (like a Universal disc) and take it with himself to use the license in many devices. The license specifies the rendering right of the DRM module, i.e. the rendering (playing) rule.

The Key Decryption Key Pb may be stored in the Authentication Agent or in the storage module of the device.

Figure 5A:
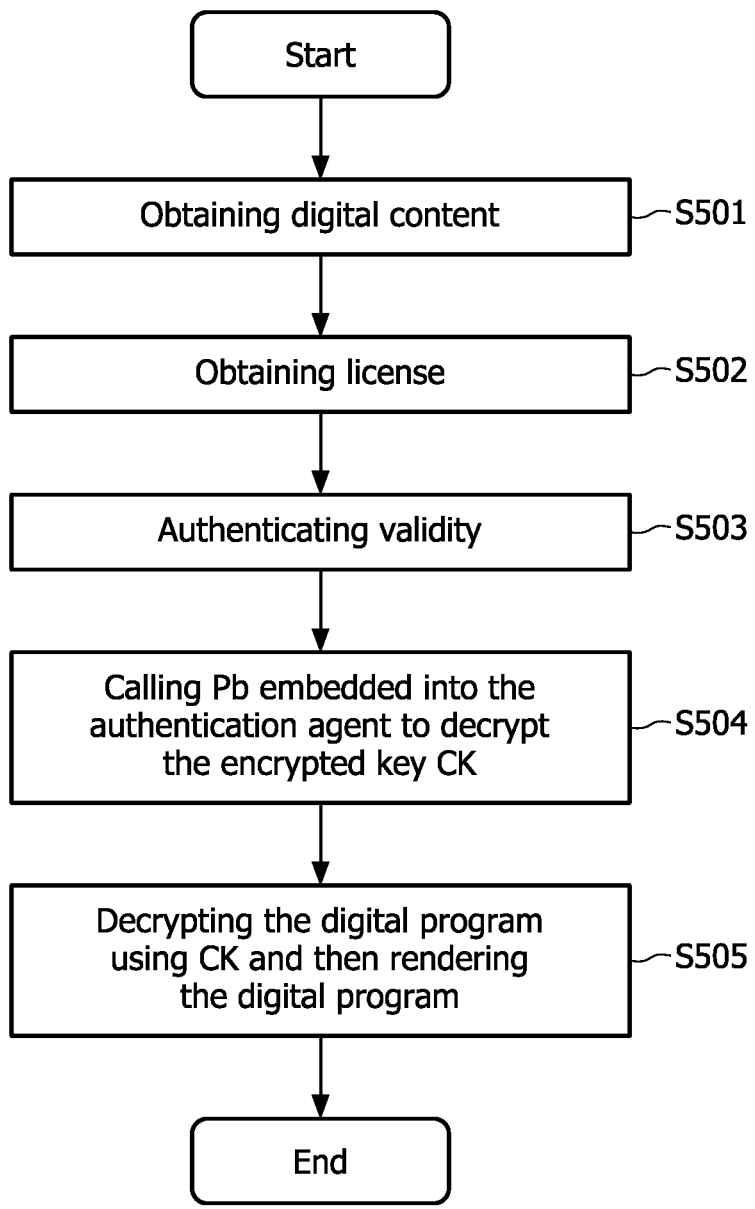
FIG. 5A shows a flow chart of rendering the digital content according to one embodiment of the present invention.

According to an embodiment of the invention, in case of the Key Decryption Key Pb is stored in the Authentication Agent, as shown in FIG. 5A, the process of using the device to obtain and render the digital contents includes the following steps:

Step S501: Obtaining the Digital Contents.

The user of device 202 obtains the desired digital content 300 from the Service Provider 201 by online or offline way.

When the user finds a digital program that he likes through the network or other advertisement, he may obtain the digital content containing said digital program in an online or an offline way, for example, by downloading from the network, or buying an optical disc, etc. The digital program in said digital content is encrypted. At the side of the Service Provider, during the process in which the digital programs are packaged into digital content, besides encrypting the digital programs, some other data are added thereto, including the authentication agent, ID, etc. Then the Service Provider encapsulates the digital content and makes a digital signature.

Alternatively, after DRM module 2022 reads in the digital content 300, it may be prompted whether the license 400 for rendering said digital content has been obtained, if the license has not been obtained, the device should first obtain the license from the Service Provider according to the prompt and then move to step S502; if the license has been obtained, it is prompted to read the license 400 and step S502 is skipped.

Step S502: Obtaining the License.

The user needs to obtain the license 400 to render the digital content, and this is required by DRM module 2022 on the device. The license 400 may be a special license for one or several items of digital contents, or it may be a universal license for all the digital contents provided by the server. Preferably, the digital content records the web site from which the license can be downloaded, so that the user device can download the license from the web site. The license can also be obtained in an offline way, such as being stored in a medium. Wherein, the license specifies the constraint for rendering, such as the times of rendering, the time of rendering, whether the digital content can be saved, whether the digital content can be printed, whether the digital content can be modified and whether an interception photo taking is supported, etc.

For the Service Provider that makes profit through Digital Right Management, the obtaining of the license may be a transaction, and online or offline payment can be required.

Step S503: Authenticating the Validity.

Alternatively, the device 202 firstly authenticates whether the obtained digital content 300 has ever been tampered, including that the DRM module 2022 extracts the digital signature of the digital content and the digital signature of the authentication agent from the obtained digital content to authenticate so as to determine whether the digital content per se and the authentication agent are valid, that is, whether they have been illegally tampered and whether it is the digital content provided by the Service Provider. The object of this operation is to enable the DRM module 2022 of device 202 to render only the digital content 300 obtained from the Service Provider 201. Since the DRM module 2022 is generally also provided by the Service Provider 201, this can urge the device user to obtain the legal digital content from the Service Provider.

The program 3012 of the authentication agent is run on the device 202, and the authentication agent 301 begins to authenticate whether device 202 is a valid rendering device. This can be realized by authenticating if the DRM module on the device is valid or by reading the inherent device serial number in the device. The whitelisting or blacklisting method is used for authentication (of course, other methods for determining the validity of the device are not excluded), or both items can be authenticated. The authentication agent may stores such a whitelist or blacklist With the development and updating of the device, when distributing digital contents, the Service Provider can continuously update the embedded blacklist or whitelist.

If the authentication is successful, which indicating that the device (i.e., the DRM module) is legally appropriate or belongs to a specified scope of devices, and then come to the next step.

Step 504: Key Decryption—Decrypting to Obtain CK by Using Pb.

The authentication agent 2021 extracts the encrypted key CK (3013) and uses the decryption algorithm formula CK=$D_{Pb}$ (encrypted CK) to decrypt the encrypted key CK. Wherein, the Key Decryption Key Pb is added to the authentication agent when the Service Provider distributes the digital content. Then key CK is sent to the DRM module. In practical use, the key decryption algorithm D can hardly be reversely compiled, so it is considered to be safe.

Step 505: DRM module 2022 uses the key CK to decrypt the encrypted digital program. Generally, it is believed that the commonly used encryption algorithms have already been pre-formulated in the DRM module, and even they can be supported by special hardware devices. Possibly, the header file of the digital content file defines the digital encryption and decryption algorithms used by the content. The DRM module decrypts the digital content through the CK obtained in step 504 using the algorithm defined in the header file of the digital content.

The DRM module reads in the license and sends the digital program to the rendering core, such as the rendering core of MEPG-2, MEPG-4, Flash player, or text reader, to be rendered. The rendering right is limited by the license.

Figure 5B:
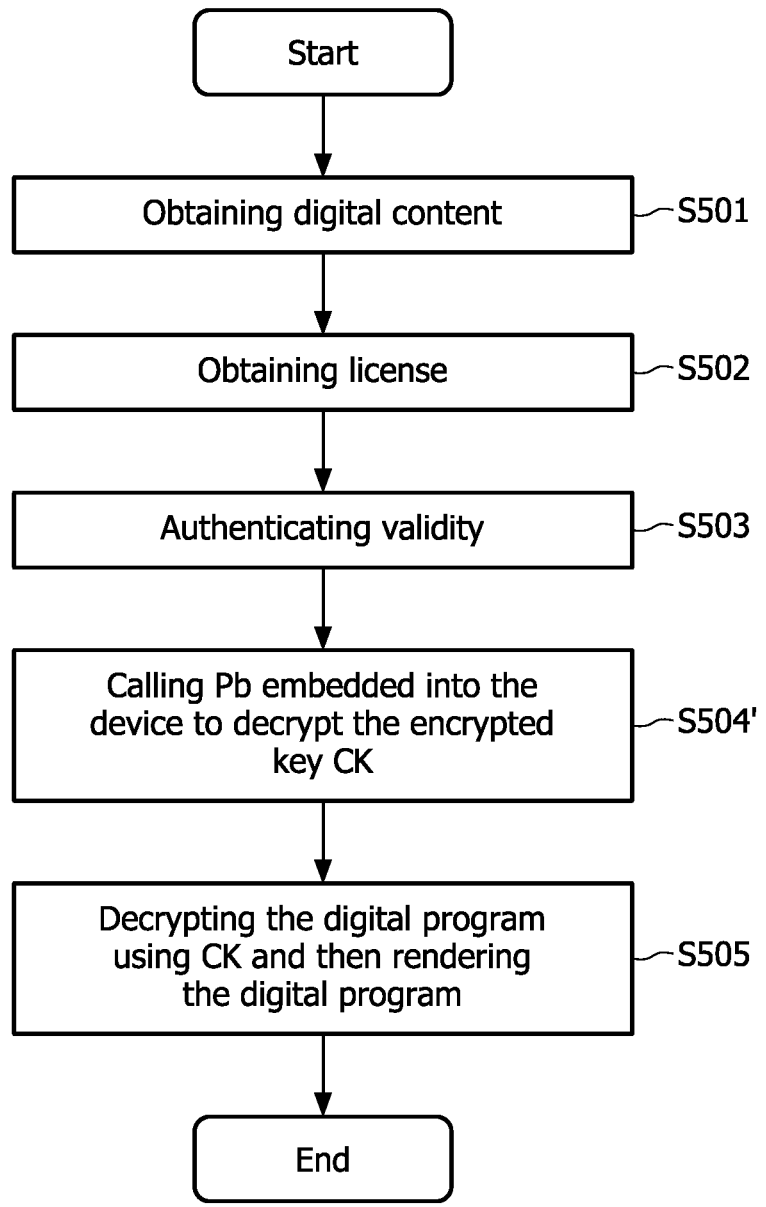
FIG. 5B shows a flow chart of rendering the digital content according to one embodiment of the present invention.

According to an embodiment of the invention where the Key Decryption Key is included in the license, referring to FIG. 5B, the process of rendering the digital content by the device differs from that in the previous embodiment in that in the key decryption process of step S504', the authentication agent reads in the pre-arranged Key Decryption Key Pb from the fixed storage medium of the device, then obtains CK using the key decryption algorithm. While the rest of the steps are substantially the same.

Furthermore, the above-mentioned digital signature and authentication signature can use various ways of making signature, including public key signature. In the present invention, in order to simplify the solution, the public key signature is used, but this does not mean to exclude other techniques of electronic signature. With respect to public key signature, the key and algorithm for authenticating the signature can be pre-solidified into the DRM module, and the DRM module authenticates the digital signature using the algorithm and key. If the digital signature is valid, it means that the content is provided by the Service Provider and is not tampered.

Those skilled in the art shall understand that any flow chart and drawings of the functional module components included in the technical solution disclosed in the invention represent various different processing that can be embodied substantively in a computer readable medium, so they can be executed by a computer or processor regardless of whether such a computer or processor has been explicitly indicated or not. It shall be understood that the invention is not limited to the above described embodiments and the improvement thereto. Those skilled in the art will be able to may many variations and improvement without departing from the concept and scope defined by the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A method for providing a digital program authorization, which comprises the steps of:
    encoding, using a processor, the digital program to associate said digital program with an authentication agent, where said authentication agent includes, an authentication agent identifier indicating a serial number of the authentication agent for associating the authentication agent with the digital program, a symmetrical encryption/decryption key CK encrypted by an asymmetrical key encryption key Pa through an encryption algorithm, a digital signature for associating an identity of an issuer of the authentication agent, and a program code executable by a device for rendering the digital program, the program code operative to: render said digital program for authenticating the validity of the device; and decrypt the encrypted key CK using an asymmetrical key decryption key Pb through a decryption algorithm corresponding to the encryption algorithm, or otherwise deliver said asymmetrical key decryption key Pb of the encrypted key to a Digital Right Management (DRM) module; where the (Pa, Pb) Key pair are an asymmetrical key pair for encrypting and decrypting the encryption/decryption key CK,
    providing a digital content including said digital program and said authentication agent to said device.

2. The method of claim 1, wherein the digital program is encrypted by a first encryption algorithm, and the decryption key of the first encryption algorithm is encrypted by a second encryption algorithm and stored in the authentication agent.

3. The method of claim 2, wherein the program code is also operable to decrypt the encrypted key of the second encryption algorithm after the validity of the device has passed the authentication so as to obtain the decrypted key of the second encryption algorithm and send the decrypted key to a DRM module in the device, and said DRM module then decrypts the encrypted digital program in the digital content; wherein the DRM module is a Digital Right Management Module pre-installed on the device.

4. The method of claim 3, wherein the authentication agent further includes a Key Decryption Key for decrypting the encrypted key; the program code in the authentication agent is operable to extract the Key Decryption Key from the authentication agent and to decrypt the encrypted key CK according to the pre-set decryption algorithm corresponding to the second. encryption algorithm.

5. The method of claim 3, wherein after obtaining the decoded digital program, the DRM module controls the rendering of the digital program according to a pre-obtained license.

6. The method of claim 5, wherein the license stipulates the right and rules for the device to render the digital content.

7. A method for rendering a digital content on a device, which comprises the steps of:
    (a) obtaining the digital content from a Service Provider, said digital content including a digital program and an authentication agent;
    (b) running, using a processor, said authentication agent to authenticate the validity of the device; where the authentication agent includes an authentication agent identifier indicating a serial number of the authentication agent for associating the authentication agent with the digital program, a symmetrical encryption/decryption key CK encrypted by an asymmetrical key encryption key Pa through an encryption algorithm and decrypted by an asymmetrical decryption key Pb through a decryption algorithm corresponding to the encryption algorithm, a digital signature for associating an identity of an issuer of the authentication agent, and a program code executable by the device for rendering the digital content, where the (Pa, Pb) Key pair are an asymmetrical key pair for encrypting and decrypting the encryption/decryption key CK;
    (c) decrypting the digital program after a successful authentication; and
    (d) rendering the decrypted digital program.

8. The method of claim 7, wherein the digital program is encrypted by a first encryption algorithm, and the decryption key thereof is embedded into the authentication agent after being encrypted by a second encryption algorithm.

9. The method of claim 7, wherein in step (b) the authentication agent authenticates the validity of the device by comparing an ID pre-set in the device and a whitelist or a blacklist embedded into the authentication agent.

10. The method of claim 8, wherein step (b) includes a step of calling a Key Decryption Key embedded into the authentication agent to decrypt the encrypted key.

11. The method of claim 8, wherein step (b) includes a step of calling from the device a Key Decryption Key that is pre-stored therein to decrypt the encrypted key.

12. A method for authenticating the validity of the device that renders digital content, which method comprises:
    embedding, using a processor, an authentication agent into the digital content so that when said digital content is led into a device, the authentication agent runs and authenticates whether the device has a qualification to render the digital content where the authentication agent includes an authentication agent identifier indicating a serial number of the authentication agent for associating the authentication agent with the digital program, a symmetrical encryption/decryption key CK encrypted by an asymmetrical key encryption key Pa through an encryption algorithm and decrypted by an asymmetrical decryption key Pb through a decryption algorithm corresponding to the encryption algorithm, a digital signature for associating an identity of an issuer of the authentication agent, and a program code executable by the device for rendering the digital content, where the (Pa, Pb) Key pair are an asymmetrical key pair for encrypting and decrypting the encryption/decryption key CK.

13. The method of claim 12, wherein the digital content includes the digital program, and the authentication agent includes the program code which is operable to compare and authenticate the identification code of a Digital Right Management (DRM) module running on the device.

14. The method of claim 12, wherein the authentication agent includes a list for comparing with the identification code pre-set in the storage module of the device and/or the identification code pre-set in a DRM module , and the program code in the authentication agent is run to compare the identification code of the device to the list so as to determine whether the device and/or the DRM module thereon are valid.

15. A device for rendering a digital content, which comprises: an obtaining program module for obtaining the digital content from a Service Provider, said digital content including a digital program and an authentication agent; a Digital Right Management (DRM) program module for running the authentication agent to authenticate the validity of the device and for decrypting the digital program after a successful authentication; and a rendering means for rendering the decrypted digital program where the authentication agent includes an authentication agent identifier indicating a serial number of the authentication agent for associating the authentication agent with the digital program, a symmetrical encryption/decryption key CK encrypted by an asymmetrical key encryption key Pa through an encryption algorithm and decrypted by an asymmetrical decryption key Pb through a decryption algorithm corresponding to the encryption algorithm, a digital signature for associating an identity of an issuer of the authentication agent, a program code executable by the device for rendering the digital content, and where the (Pa, Pb) Key pair are an asymmetrical key pair for encrypting and decrypting the encryption/decryption key CK.

16. The device of claim 15, wherein the digital content further includes a content ID and a content digital signature which indicates information like the identity of the digital content issuer and the time and protects the integrity of the data.

* * * * *